United States Patent [19]

Oishi et al.

[11] Patent Number: 4,752,059
[45] Date of Patent: Jun. 21, 1988

[54] INJECTION MOLD

[75] Inventors: Kengo Oishi; Osamu Suzuki, both of Odawara, Japan

[73] Assignee: Fuji Photo Film Co., Ltd., Kanagawa, Japan

[21] Appl. No.: 76,814

[22] Filed: Jul. 23, 1987

[30] Foreign Application Priority Data

Jul. 23, 1986 [JP] Japan .................. 61-112890[U]

[51] Int. Cl.⁴ .......................................... B29C 45/14
[52] U.S. Cl. ....................... 249/95; 156/289; 249/115; 249/144; 249/151; 249/175; 249/176; 264/264; 425/112; 425/127; 425/129.1; 425/542; 425/DIG. 55
[58] Field of Search ................ 249/63, 64, 91, 95, 249/115, 144, 151, 160, 175, 176; 425/110, 112, 122, 127, 129 R, 542, DIG. 55; 264/264; 156/289

[56] References Cited

U.S. PATENT DOCUMENTS 3,925,530 12/1975 Rees .......................... 249/115
4,061,455 12/1977 von Holdt .................. 425/112
4,269,579 5/1981 Thomas ....................... 425/112

FOREIGN PATENT DOCUMENTS 2035222 6/1980 United Kingdom ....... 425/DIG. 55

Primary Examiner—Jay H. Woo
Assistant Examiner—Timothy W. Heitbrink
Attorney, Agent, or Firm—Sughrue, Mion, Zinn, Macpeak & Seas

[57] ABSTRACT

A transfer film comprising a base film and a releasant layer, an ink layer and an adhesive layer laminated on the base film in this order is inserted into a cavity of an injection mold, and injection molding material is injected into the cavity. After the molded article is removed from the mold, the base film is peeled off and the ink layer is transferred to the surface of the molded article. The injection mold has a coring pin for forming an opening in the molded article and the contact surface of the coring pin to be brought into contact with the adhesive layer of the transfer film has poor adhesion to the adhesive layer so that the bond strength between the contact surface of the coring pin and the adhesive layer is lower than those between the ink layer and the releasant layer and between the releasant layer and the base film.

2 Claims, 2 Drawing Sheets

1

INJECTION MOLD

BACKGROUND OF THE INVENTION

1. Field of the Invention

This invention relates to an injection mold, and more particularly to an improvement of an injection mold suitable for in-mold decorating in which a transfer film is positioned in the cavity of the mold before injection of injection material so that the design on the transfer film is transferred to the surface of the molded article.

2. Description of the Prior Art

There has been known an art of providing a design on an injection-molded article by injection-molding the article with a transfer film bearing thereon the design being inserted into the cavity of the injection mold. This art is generally referred to as "in-mold decorating". That is, the transfer film generally comprises a base film, and a releasant layer, an ink layer representing the design and an adhesive layer laminated on the base film in this order, and when molding material is injected into the cavity with the transfer film being in the cavity, the transfer film is bonded to the surface of the molded article after the molding material is solidified. When the base film is peeled off after the article is removed from the cavity, the ink layer is transferred to the surface of the article by virtue of the releasant layer.

In-mold decorating using a transfer film will be now described in more detail with respect to in-mold decorating of a cassette half by way of example. The cassette body 20 as shown in FIG. 7 is injection-molded by use of a mold comprising a stationary mold half 1 and a movable mold half 2 as shown in FIG. 4. The halves 1 and 2 are respectively provided with recesses 3 and 4 for forming, when the mold is closed, a cavity having a shape conforming to the shape of the cassette half 20. Since the cassette half 20 has openings such as hub holes 21, a window 22, reference holes 23, and capstan holes 24 as shown in FIG. 7, like numbers of coring pins are provided in the stationary mold half 1 to project into the cavity and abut against the bottom of the recess 4 of the movable mold half 2 with a transfer film 10 intervening therebetween when the mold is closed. In FIGS. 4 and 5, only coring pins 5 and 6 for forming one of the hub holes 21 and one of the capstan holes 24 are shown. Further, the stationary mold half 1 is provided with a sprue 1a through which injection material is injected into the cavity.

With the mold is opened, i.e., the movable mold half 2 is positioned away from the stationary mold half 1, the transfer film 10 is positioned in place between the mold halves 1 and 2 as shown in FIG. 4. Thereafter, the mold is closed by bringing the movable half 2 into close contact with the stationary half 1, and injection material 7 is injected into the cavity through the sprue 1a to fill it as shown in FIG. 5. The transfer film 10 comprises a releasant layer 12, an ink layer 13 and an adhesive layer 14 laminated on a base film 11 in this order as shown in FIG. 6, and the transfer film 10 is positioned so that the injection material 7 fills the cavity on the side of the adhesive layer 14. Accordingly, the transfer film 10 is bonded to the molded cassette body by the adhesive layer 14. By peeling the base film 11 after the injection material 7 is solidified and the molded cassette body is removed from the mold, the ink layer 13 is transferred to the surface of the molded cassette body.

However, there has been a problem in such in-mold decorating that the front end faces 5a and 6a of the coring pins 5 and 6 for forming the hub hole 21 and the capstan hole 24, for instance, directly abut against the adhesive layer 14, and the ink layer 13 is transferred to the front end faces 5a and 6a when the mold is opened. As the molding cycles are repeated, the stacked ink layers on the front end faces 5a and 6a can cause finning around the hub hole 21 and the capstan hole 24. Further, the ink layer can subsequently peel from the front end faces 5a and 6a to contaminate the molded cassette body.

SUMMARY OF THE INVENTION

In view of the foregoing observations and description, the primary object of the present invention is to provide an injection mold suitable for in-mold decorating in which the ink layer of the transfer film is prevented from adhering to the front end face of the coring pin.

The injection mold in accordance with the present invention is characterized in that the contact surface of the coring pin to be brought into contact with the adhesive layer of the transfer film has poor adhesion to the adhesive layer so that the bond strength between the contact surface of the coring pin and the adhesive layer is lower than those between the ink layer and the releasant layer and between the releasant layer and the base film.

It is preferred that the contacting surface of the coring pin be made to have poor adhesion to the adhesive layer by stoving thereon Teflon coating.

DESCRIPTION OF THE PREFERRED EMBODIMENT

Figure 1:
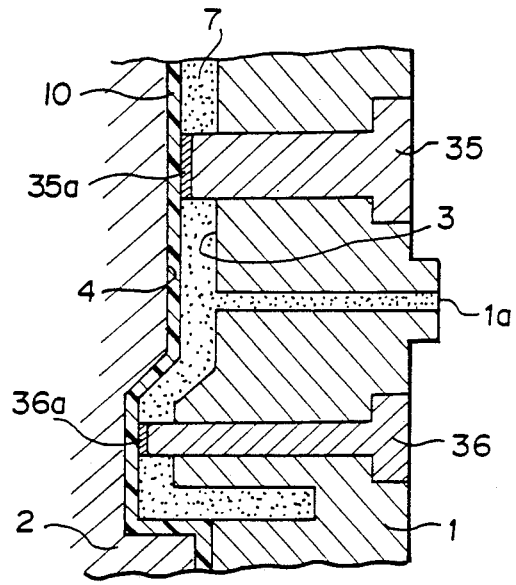
FIG. 1 is a fragmentary cross-sectional view showing a part of an injection mold in accordance with an embodiment of the present invention.
Figure 4:
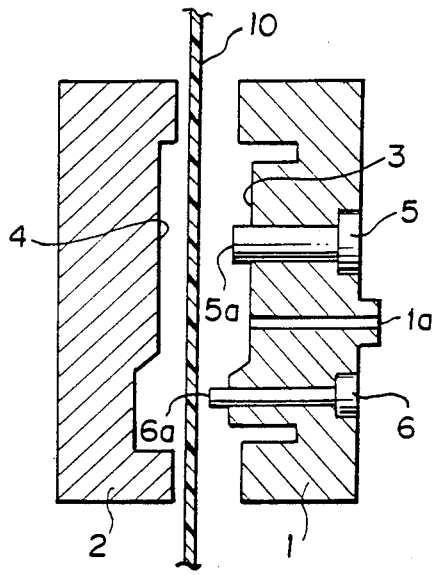
FIGS. 4 and 5 are cross-sectional views for illustrating in-mold decorating.
Figure 5:
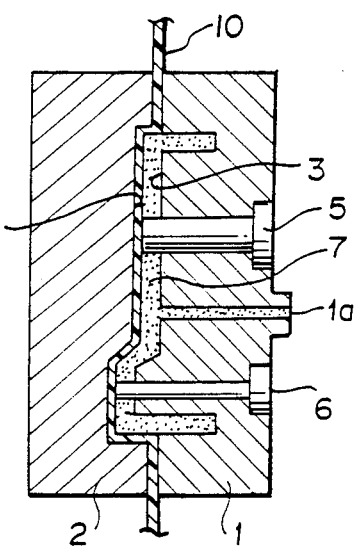
Figure 6:
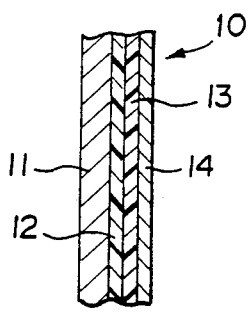
FIG. 6 is a cross-sectional view of a transfer film which is employed in in-mold decorating.
Figure 7:
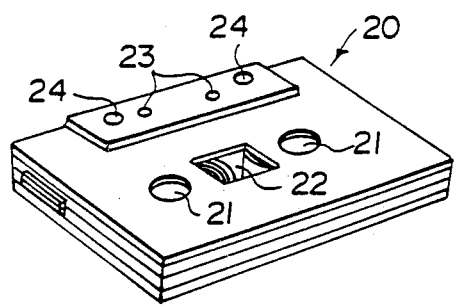
FIG. 7 is a perspective view showing a cassette half.

The injection mold shown in FIG. 1 differs from the conventional injection mold shown in FIGS. 4 and 5 solely in that coring pins for forming openings in a molded cassette half, e.g., coring pins 35 and 36 for forming the hub hole 21 and the capstan hole 24, have poor adhesion to the adhesive layer 14 of the transfer film 10 at the contacting surfaces 35a and 36a at which they are brought into contact with the adhesive layer 14 when the mold is closed. That is, the contacting surfaces 35a and 36a are bonded to the adhesive layer 14, when they are pressed against the adhesive layer 14, with a bond strength lower than those between the ink layer 13 and the releasant layer 12 and between the releasant layer 12 and the base film 11. In this particular embodiment, the contacting surfaces 35a and 36a are provided with stoved Teflon-coating layers to have such poor adhesion to the adhesive layer 14.

Figure 2:
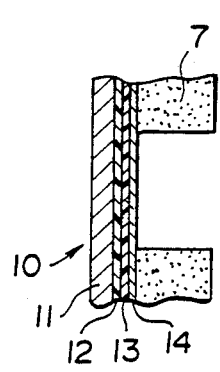
FIG. 2 is an enlarged view of a part of the molded cassette in the condition immediately after it is removed from the injection mold and before the base film is peeled.
Figure 3:
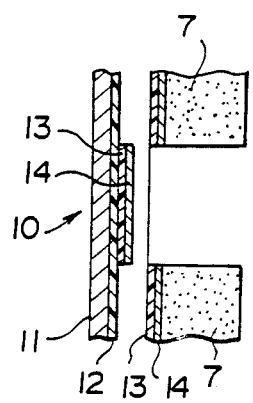
FIG. 3 is a view similar to FIG. 2 but showing the condition after the base film is peeled.

When the movable mold half 2 is moved away from the stationary mold half 1 during a molding cycle of the cassette half by use of the injection mold of this embodiment, the molded cassette body accompanies the movable mold half 2 away from the stationary mold half 1. At this time, since the contacting surfaces 35a and 36a of the coring pins 35 and 36 have poor adhesion to the adhesive layer 14, the portions of the ink layer 13 opposed to the contacting surfaces 35a and 36a of the coring pins 35 and 36 move together with the rest of the transfer film 10 away from the coring pins 35 and 36. Accordingly, as shown in FIG. 2, when the molded cassette half is removed from the mold, the transfer film 10 is bonded to the molded cassette body by the adhesive layer 14 with the portion of the adhesive layer 14 and the portion of the ink layer 13 corresponding to the contacting surfaces of the coring pins remaining on the transfer film 10. When the base film 11 of the transfer film 10 is subsequently peeled off, the portion of the adhesive layer 14 and the portion of the ink layer 13 corresponding to the contacting surfaces of the coring pins are removed from the cassette body together with the base film 11 and the releasant layer 12 with the remaining part of the adhesive layer 14 and the ink layer 13 kept on the cassette body as shown in FIG. 3.

As can be understood from the description above, in the injection mold in accordance with the present invention, the ink layer and the adhesive layer of the transfer film cannot adhere to the coring pins.

We claim:

1. An injection mold for use in in-mold decorating in which a transfer film comprising a base film, a releasant layer, an ink layer and an adhesive layer laminated in this order is positioned in the cavity of the mold and then injection material is injected into the cavity so that the ink layer is transferred to the surface of the molded article, the injection mold having a coring pin for forming an opening in the molded article, characterized in that a contact surface of the coring pin to be brought into contact with the adhesive layer of the transfer film has poor adhesion to the adhesive layer so that the bond strength between the contact surface of the coring pin and the adhesive layer is lower than those between the ink layer and the releasant layer and between the releasant layer and the base film.

2. An injection mold as defined in claim 1 in which the coring pin has as its contacting surface a Teflon coating.

* * * * *